Dec. 2, 1924.
C. A. PARSONS ET AL
1,517,748
RESILIENT MOUNTING SUITABLE FOR TOOTHED WHEEL TRANSMISSION GEARING
Filed Dec. 14, 1923   6 Sheets-Sheet 1
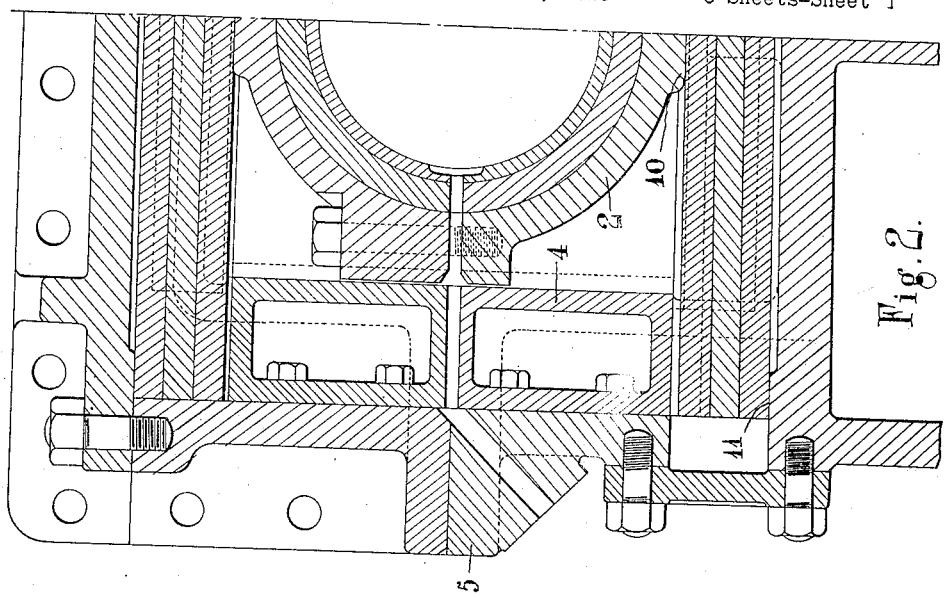
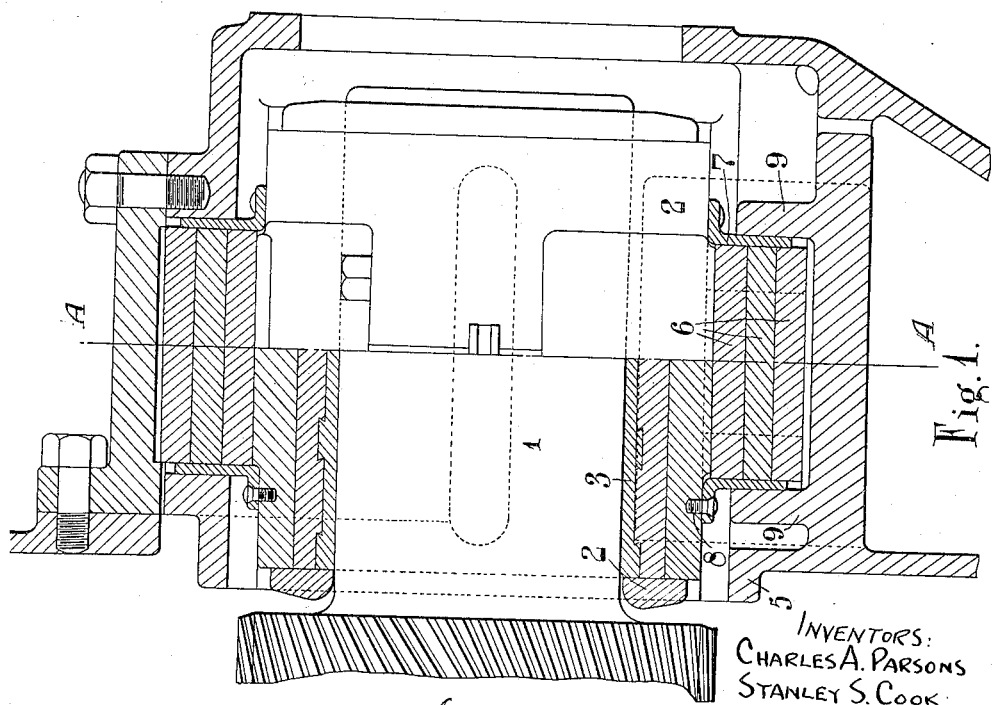
INVENTORS:
CHARLES A. PARSONS
STANLEY S. COOK
by Spear, Middleton, Donaldson, Hall
Attys.

Dec. 2, 1924.
C. A. PARSONS ET AL
1,517,748
RESILIENT MOUNTING SUITABLE FOR TOOTHED WHEEL TRANSMISSION GEARING
Filed Dec. 14, 1923  6 Sheets-Sheet 5

INVENTORS:
CHARLES A. PARSONS
STANLEY S. COOK
by Spear, Middleton, Donaldson, Hall
Attys.

Patented Dec. 2, 1924.

1,517,748

UNITED STATES PATENT OFFICE.

CHARLES ALGERNON PARSONS AND STANLEY SMITH COOK, OF NEWCASTLE-ON-TYNE, ENGLAND; SAID COOK ASSIGNOR TO SAID PARSONS.

RESILIENT MOUNTING SUITABLE FOR TOOTHED-WHEEL TRANSMISSION GEARING.

Application filed December 14, 1923. Serial No. 680,657.

*To all whom it may concern:*

Be it known that we, CHARLES ALGERNON PARSONS and STANLEY SMITH COOK, both subjects of the King of Great Britain and Ireland, and both residing at Heaton Works, Newcastle-on-Tyne, in the county of Northumberland, England, have invented certain new and useful Improvements in and Relating to Resilient Mountings Suitable for Toothed-Wheel Transmission Gearing, of which the following is a specification.

This invention relates to resilient mountings specially applicable to toothed wheel transmission gearing.

Such mountings may be used in general to prevent transmission of vibration through the mounting to the main supporting structure but they are specially applicable, as described or indicated in the specification of British Patent No. 22815 of 1912, granted to one of the present applicants, to the case of toothed wheel transmission gearing in order to minimize the effects of inaccuracies in the pitch or form of the teeth; in addition, it has been found advisable in certain of the particular applications to which reference is made above to provide appropriate damping devices in conjunction with the resilient mountings.

The main object of the present application is to provide both for resilience and damping in a resilient mounting of the kind referred to above in a form which shall be both simple and compact.

With such an object:—

The invention consists in a resilient mounting of the type indicated specially applicable to toothed wheel transmission gearing, in which the member to be mounted is suitably guided and arranged between or in conjunction with resilient elements preferably of plate or bar form so disposed that on bending under load they act as damping elements by rubbing against each other or against appropriate distance pieces, guides, stops or the like.

The invention further consists in a resilient mounting as set forth in the preceding paragraph in which the resilient elements are pressed together, with or without the interposition of distance pieces, by appropriate means, such as springs, provided for the purpose.

The invention also consists in a resilient mounting as set forth in the preceding paragraphs in which certain of the resilient elements are arranged to sag and others to hog under load.

The invention still further consists in the application of a resilient mounting, as set forth in the preceding paragraphs, to the shaft or spindle of one of a pair of gear wheels, the bearings of which shaft are restrained against movement in the plane through the axes of the two said gear wheels by suitable guides and are controlled in the direction perpendicular thereto by the resilient damping elements.

The invention finally consists in the improved resilient seatings and applications thereof hereinafter described or indicated.

Referring to the accompanying drawings:—

Figure 1 is a sectional elevation of the resilient mounting applied to the shaft of a toothed wheel;

Figure 2 is a sectional end view on the line A—A of Figure 1;

Figure 3:
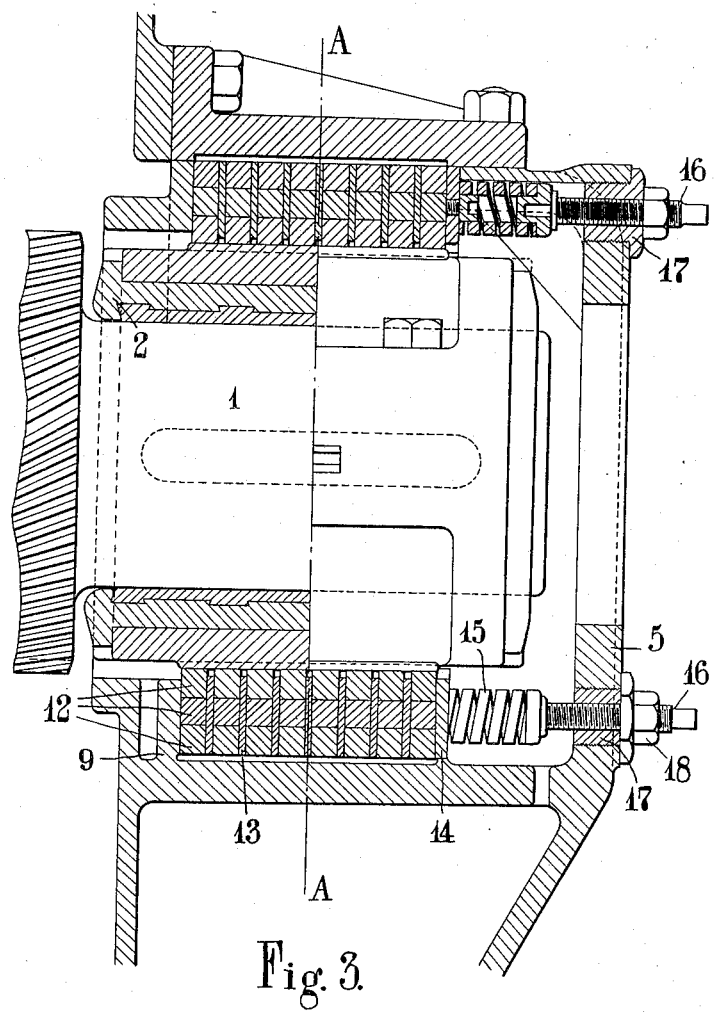
Figure 3 is a sectional elevation of another form of the resilient mounting.

In carrying out the invention according to one form illustrated in Figures 1 and 2, as applied to the bearing of a toothed wheel transmission gearing, for example, to the intermediate shaft of a double reduction gearing, the journal 1 is carried in a bearing 2 provided with the usual bushes 3, the bearing itself being guided in, say, a vertical direction by appropriate surfaces 4 on the main housing 5.

Above and below the bearing the resilient elements 6 are arranged, the lower set of which takes the load.

As the upper and lower resilient elements are of the same nature only the lower set will be herein described.

This composite resilient element is formed of several substantially flat plates 6 of equal dimensions arranged one above the other with their flats in contact, their length being disposed transversely to the axis of the journal. The breadth of these elements, 6, which are centrally arranged with regard to the length of the journal, may be about one-half of the latter. To prevent lateral motion with respect to the bearing, they may be confined between angle brackets 7 or the like attached to the bearing 2 by means of screws 8 or the like, these angle brackets being in turn restrained as regards lateral motion by appropriate guides or stops 9 on the housing. The bearing itself is provided with a centrally projecting facing 10 which is supported at the centre of the length of the plates 6 which rest at their ends on supports 11 forming part of the housing. Three such resilient plates 6 are shown but any number may be employed.

The housing 5 is built up in parts as required for assembly, suitable covers being provided where desirable for purposes of access.

It will be seen that in the form of the invention described the resilient plates 6 provide whatever freedom of movement is required, while their bending causes a slight amount of friction between adjacent surfaces, thereby exerting a damping effect to prevent oscillation.

In carrying out the invention according to another form illustrated in Figure 3, the plates are replaced by a series of piles of rectangular bars 12 adjacently disposed, such, for example, as would result from cutting the plates of the first form of the invention longitudinally by vertical planes. Between the adjacent piles of bars 12, fixed distance pieces 13 are interposed while instead of confining these bars between rigid guides or stops in the housing, a plate 14 is provided at one end on which coil springs 15 act so as to press the piles of bars 12 and distance pieces 13 into contact with a guide or stop at the other end. One such spring is shown but any number may be used. The pressures of the coil springs are made adjustable by means of screws 16 passing through suitable screwed plugs 17 secured in the housing 5. The screws 16 are accessible from the outside and are locked in position by means of lock nuts 18. Any other convenient means may be used for adjusting the pressure of the coil springs.

Figure 4:
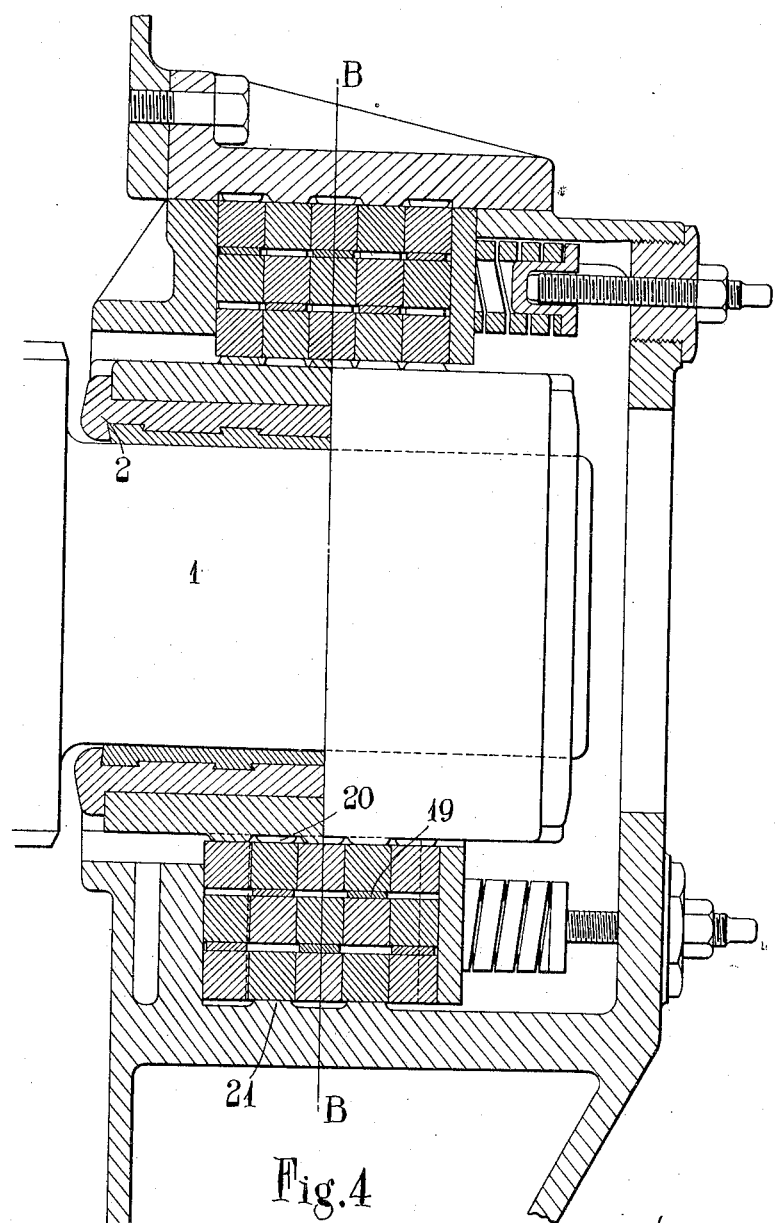
Figure 4 is a sectional elevation of another form of resilient mounting.
Figure 5:
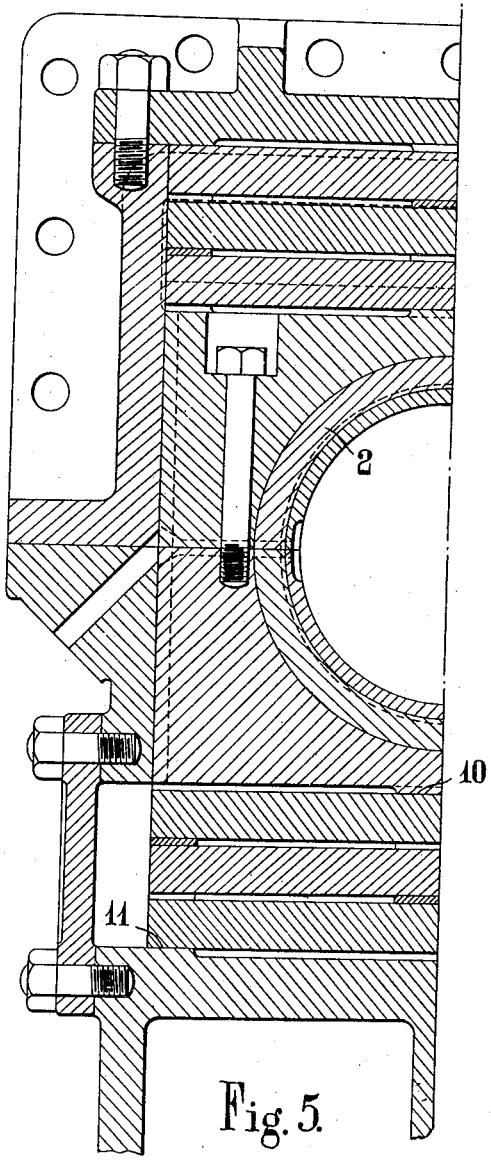
Figure 5 is a sectional end view on the line B—B of Figure 4.

According to a third form of the invention illustrated in Figures 4 and 5, the piles of bars, pressed together by coil springs as above, are arranged so that certain of them sag under the load and the others hog.

Thus, taking the case of five adjacent piles each of three bars 12, the first, third and fifth piles are constructed and arranged in the same manner. In each of these the load is applied by the central facing 10 on the bearing which is supported at the centre while distance pieces 19 are provided between the ends of the upper and middle bars, a distance piece 19 being likewise provided at the centre between the middle and lower bars, while finally the lower bar itself is supported at each end on appropriate facings 11 in the housing. Similarly, the second and fourth piles are likewise identical, but in each of these cases the load is applied to the upper bar of the pile at its ends by the facings 20, and distance pieces 19 are introduced between the centres of the upper and middle bars and between the ends of the middle and lower bars, the latter bar being finally supported at its centre on the housing on suitable facings 21. Thus, each bar bends in a contrary direction to its neighbours whether disposed in a horizontal or vertical direction.

Variations of the arrangements described may be made; for example, by causing alternate piles to hog and sag as a whole.

According to another form of the invention the gear shaft bearing housings may be supported on levers, movement of the levers being controlled by springs with damping means arranged in any convenient manner, and if desired the levers supporting the bearings at opposite ends of the gear wheel may be united so as to equalize the loads.

Figure 6:
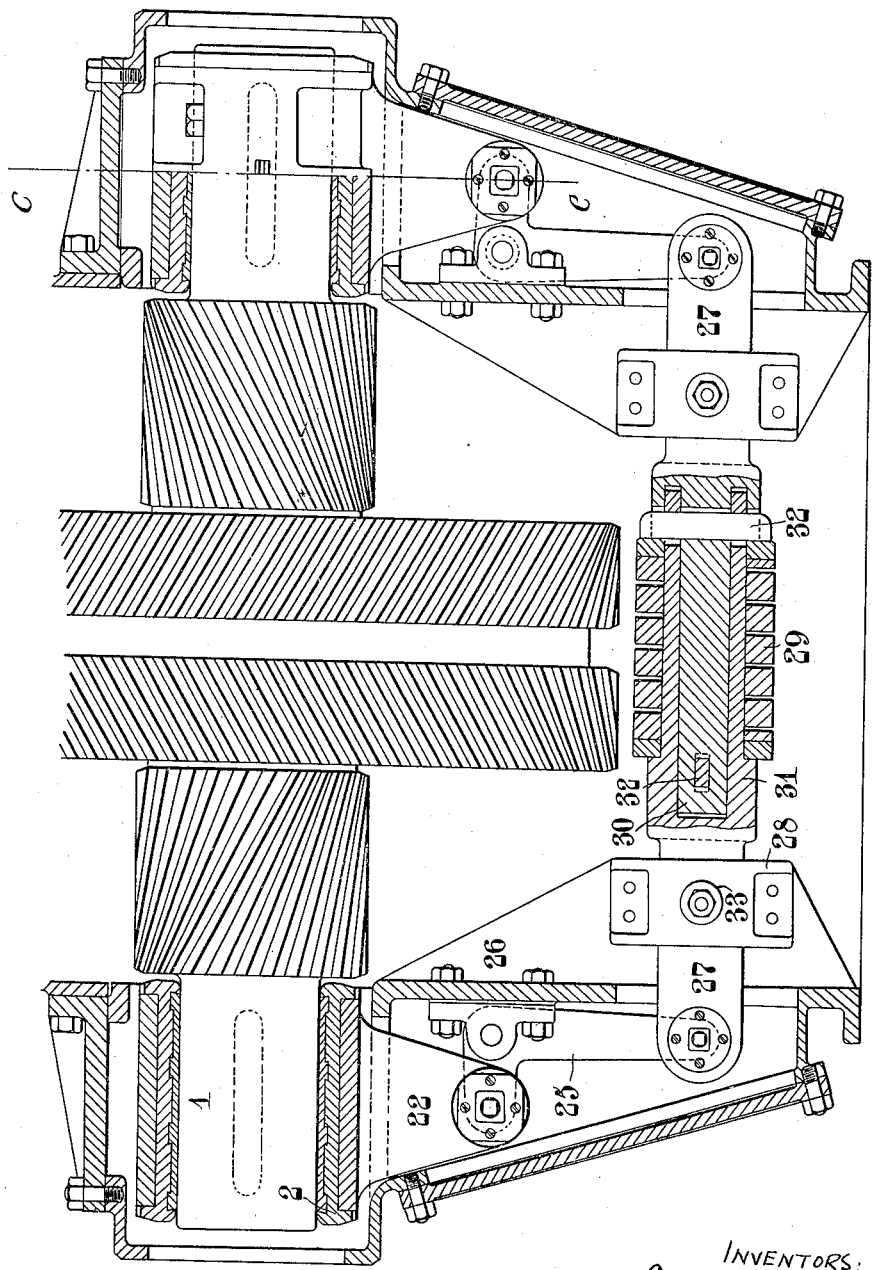
Figure 6 is a modification in which the bearings are mounted upon levers controlled by springs.
Figure 7:
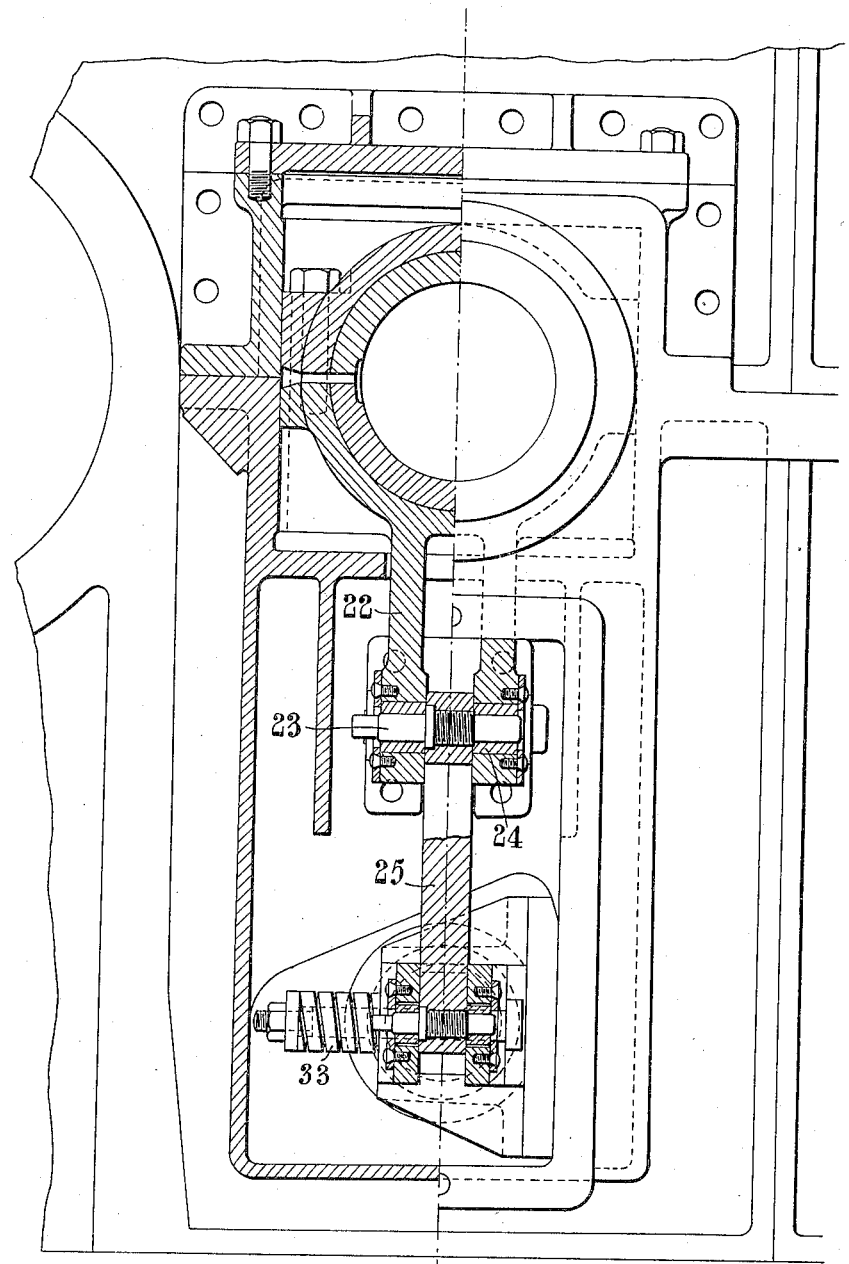
Figure 7 is a section on the line C—C of Figure 6.

Thus, as illustrated in Figures 6 and 7 the journals 1 at each end of the intermediate shaft of a double-reduction gearing may be mounted in bearings 2 guided in their housing 5 and provided below with lugs 22 pivotally connected by means of a pin 23 mounted in bushes 24 to the short arm of a bell-crank lever 25 mounted on a bracket 26 on the housing. The bell-cranks at the two ends of the shaft are reversely disposed, the long ends being connected by a link 27, preferably passing through suitable guides 28 and including in its structure a coiled spring 29. Thus, the link may, for example, consist of two parts provided respectively with a plug 30 and socket 31 which are connected together by cotters 32 and surrounded by a coiled spring 29. The coiled spring exerts a pressure which forces the two long arms of the bell-cranks apart and thus resiliently holds the bearings in the desired position for the engagement of the gears. The damping is produced by the friction of the link 27 in the guide 28, this friction being augmented by a coil spring 33 which presses the link against the face of the guide.

Any other arrangement of supporting the bell-crank levers in a resilient manner may be employed.

Or again, the arrangement may be such as definitely to constrain the bearings to move equal amounts in the same direction, so as to preserve the alignment of the shaft, suitable adjusting means being introduced, if desired.

When the invention is applied to the support of a shaft or spindle of one of a pair of gear wheels, suitable guides are provided in the housing of the bearings preferably to prevent the said shaft or spindle from having movement in the plane passing through the axes of the two said gear wheels, while allowing movement of the shaft in a direction perpendicular thereto, said movement being controlled by the resilient damping elements.

It will be seen that the invention, specific forms of which have been described above by way of example, provides both for the resilient mounting and for the introduction of a sufficient amount of damping, while the arrangement and form of the resilient elements themselves enable them to be packed in the housing in a manner which does not greatly increase the dimensions of the latter.

The precise arrangement and form of the resilient mountings and housing may be varied from the examples given above without exceeding the scope of the invention, while in addition such mountings may be applied to any case where resilience and damping in a compact form are desired.

Having now described our invention, what we claim as new and desire to secure by Letters Patent is:—

1. A resilient mounting for shafts comprising in combination shaft bearings, fixed guides allowing said bearings to move transversely to said shaft, and flexible resilient and damping means controlling the transverse movement of said bearings in both directions, as set forth.

2. A resilient mounting for shafts comprising in combination shaft bearings, fixed guides allowing said bearings to move transversely to said shaft, resilient members on opposite sides of said bearings in operative relation thereto, and means for applying pressure to the lateral faces of said resilient members for damping purposes, as set forth.

3. A resilient mounting for shafts comprising in combination, shaft bearings, a housing around each of said bearings, guides in said housing allowing transverse movement of said bearings, a plurality of resilient bars packed in said housing arranged in operative relation to said bearing, and means for damping out oscillations in said resilient bars, as set forth.

4. A resilient mounting for shafts comprising in combination, shaft bearings, fixed guides allowing said bearings to move transversely to said shaft, series of piles of resilient bars in operative relation thereto, and means for producing friction between the lateral faces of said piles, as set forth.

5. A resilient mounting for shafts comprising in combination shaft bearings and a plurality of resilient bars in operative relation to said bearings together with means for producing friction on the lateral faces of said bars for the purpose of damping, as set forth.

6. In a resilient mounting for shafts the combination including bearings, a series of piles of resilient members in operative relation to said bearings, said piles alternately hogging and sagging under load, and means for supplying pressure to the lateral faces of said piles, as set forth.

7. A resilient mounting for shafts comprising in combination, shaft bearings, flexible resilient and damping means controlling the movement of said bearings transversely to said shaft, and means for varying the degree of said damping, as set forth.

8. A resilient mounting for shafts comprising in combination shaft bearings, a plurality of resilient bars in operative relation to said bearings, means for producing friction on the lateral faces of said bars, and means for varying the amount of said friction, as set forth.

In testimony whereof we have signed our names to this specification.

CHARLES ALGERNON PARSONS.
STANLEY SMITH COOK.